US012801693B2

(12) United States Patent
Piao et al.

(10) Patent No.: US 12,801,693 B2
(45) Date of Patent: Nov. 17, 2026

(54) LEARNING SYSTEM, LEARNING DEVICE, LEARNING METHOD, AND STORAGE MEDIUM

(71) Applicant: Canon Kabushiki Kaisha, Tokyo (JP)

(72) Inventors: Longxun Piao, Nasushiobara (JP); Sho Sasaki, Utsunomiya (JP); Kosuke Arita, Otawara (JP)

(73) Assignee: Canon Kabushiki Kaisha, Tokyo (JP)

( * ) Notice: Subject to any disclaimer, the term of this patent is extended or adjusted under 35 U.S.C. 154(b) by 910 days.

(21) Appl. No.: 17/809,141

(22) Filed: Jun. 27, 2022

(65) Prior Publication Data

US 2023/0020543 A1 Jan. 19, 2023

(30) Foreign Application Priority Data

Jul. 16, 2021 (JP) ................................ 2021-117700

(51) Int. Cl.
*G06F 18/20* (2023.01)
*G06F 18/21* (2023.01)
*G06F 18/211* (2023.01)

(52) U.S. Cl.
CPC .......... *G06F 18/211* (2023.01); *G06F 18/217* (2023.01); *G06F 18/285* (2023.01)

(58) Field of Classification Search
CPC .... G06F 18/211; G06F 18/217; G06F 18/285; G06N 20/00
See application file for complete search history.

(56) References Cited

U.S. PATENT DOCUMENTS

2018/0018590 A1* 1/2018 Szeto .................... G16H 10/60
2019/0304603 A1* 10/2019 Takata .................. G06N 20/00
2020/0335187 A1* 10/2020 Lefkofsky ............. G06F 16/634
2021/0097381 A1* 4/2021 Daykin .................... G06N 3/04
2021/0097439 A1* 4/2021 Vodencarevic ........... G06F 8/71
2021/0142223 A1* 5/2021 Choudhury ........... G06F 16/901
2021/0225463 A1* 7/2021 Knighton, Jr. ......... G06N 3/045
2021/0257095 A1* 8/2021 Zacharia ................ G06N 5/027
2022/0350790 A1* 11/2022 Kalyanam ............... G06F 40/30
2022/0392048 A1* 12/2022 Henry ...................... G06N 3/08

FOREIGN PATENT DOCUMENTS

JP 2017-519282 A 7/2017
JP 2017-520824 A 7/2017
JP 2020-530917 A 10/2020
WO WO 2015/175154 A1 11/2015
WO WO 2015/175155 A1 11/2015
WO WO 2019/079182 A1 4/2019

OTHER PUBLICATIONS

Article entitled "A Traffic Flow Simulation Framework for Learning Driver Heterogeneity from Naturalistic Driving Data using Autoencoders", by Yurtsever et al., dated 2019 (Year: 2019).*

* cited by examiner

*Primary Examiner* — Mahesh H Dwivedi
(74) *Attorney, Agent, or Firm* — Oblon, McClelland, Maier & Neustadt, L.L.P.

(57) ABSTRACT

A learning system includes processing circuitry. The processing circuitry is configured to acquire a first data distribution for a first data set out of data sets based on a first cohort, to select a second cohort that is used to update a first model out of a plurality of second cohorts on the basis of the acquired first data distribution, and to update the first model on the basis of at least part of a second data set out of data sets based on the selected second cohort.

11 Claims, 11 Drawing Sheets

LEARNING SYSTEM, LEARNING DEVICE, LEARNING METHOD, AND STORAGE MEDIUM

CROSS-REFERENCE TO RELATED APPLICATION

The present application claims priority based on Japanese Patent Application No. 2021-117700 filed on Jul. 16, 2021, the content of which is incorporated herein by reference.

FIELD

Embodiments described in this specification and disclosed in the drawings relate to a learning system, a learning device, a learning method, and a storage medium.

BACKGROUND

In the field of medicine, since client data on sites is highly confidential, distributed learning (online learning) by which a model can be constructed without directly sharing the client data. Such a learning technique is highly useful in the field of medicine. For example, a model learned on the basis of data sets based on a cohort of patients or the like by each client (a local model) is used in distributed learning.

However, in a medical facility such as a small clinic or a small-scaled hospital, the number of factors of training data of samples or the like may be small, and training data for training a local model may not be sufficiently provided, but may be insufficient. When training data is insufficient, it is difficult to generate a model with high accuracy even when a client learns local data.

DETAILED DESCRIPTION

Hereinafter, a learning device, a learning system, a learning method, and a storage medium according to embodiments will be described with reference to the accompanying drawings. In the following description, elements having the same functions or the like may be referred to by the same reference signs and description thereof may be omitted.

A learning system according to an embodiment includes processing circuitry. The processing circuitry is configured to acquire a first data distribution for a first data set out of data sets based on a first cohort, to select a second cohort that is used to update a first model out of a plurality of second cohorts on the basis of the acquired first data distribution, and to update the first model on the basis of at least part of a second data set out of data sets based on the selected second cohort.

First Embodiment

Figure 1:
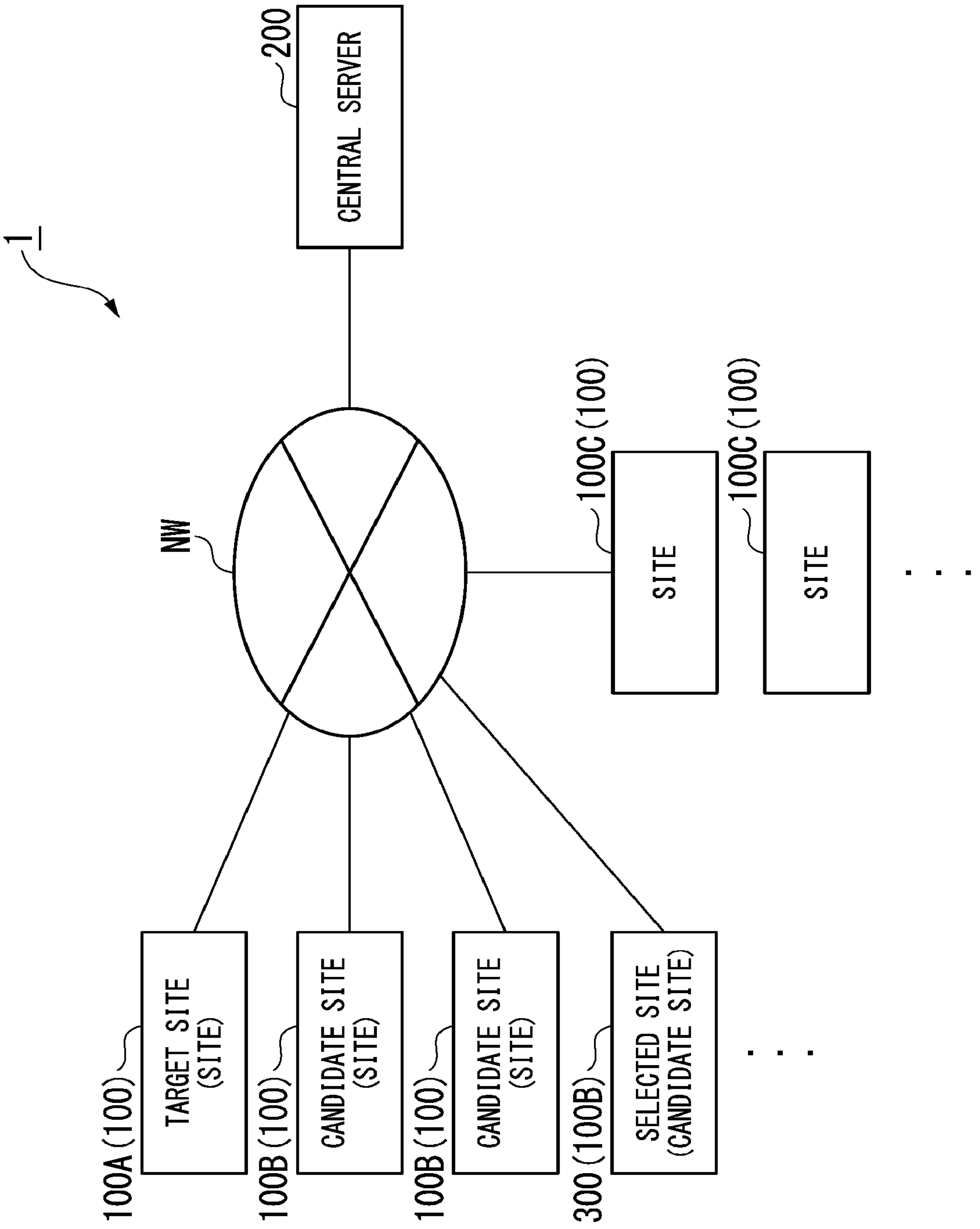
FIG. 1 is a diagram showing a configuration of a learning system 1 according to a first embodiment.

FIG. 1 is a diagram showing a configuration of a learning system 1 according to a first embodiment. The learning system 1 includes, for example, a plurality of sites 100 and a central server 200. The plurality of sites 100 are connected to the central server 200 via a communication network NW such that data can be transmitted and received therebetween. The central server 200 generates a global model by distributed learning using training data acquired by the plurality of sites 100 and provides the generated global model to the plurality of sites 100.

The communication network NW represents the entirety of information communication networks using telecommunication technology. The communication network NW includes the telephone communication network, the optical-fiber communication network, the cable communication network, and the satellite communication network in addition to a wireless/wired LAN such as a hospital core local area network (LAN) or the Internet.

Each site 100 includes, for example, a learning device that is provided in a medical facility. The sites 100 collect data sets based on cohorts and operate a trained model. The sites 100 collect or provide information on treatment or diagnosis in medical facilities by operating the model. The sites 100 include, for example, a target site 100A, a candidate site 100B, and a plurality of other sites 100C. The target site 100A is, for example, a small-scale site provided in a medical facility such as a small clinic or a small-scaled hospital. The target site 100A is an example of a first site.

The candidate site 100B is, for example, a large-scale site that is provided in a large-scale medical facility such as a general hospital. The sites 100 include a plurality of candidate sites 100B. Each of the other sites 100C is a site with the same scale as one of the target site 100A and the candidate site 100B or a site with a different scale.

In the following description, when the candidate sites 100B are distinguished, the candidate sites are branch-numbered such as a first candidate site 100B-1, a second candidate site 100B-2, and a third candidate site 100B-3. One of the plurality of candidate sites 100B becomes a selected site 300. The candidate site 100B is an example of a second site.

The central server 200 is provided, for example, in a facility other than the medical facility. The central server 200 collects information of the sites 100 and analyzes the collected information to generate information which is provided to the medical facility or transmits the generated information to the sites 100 such that the information is provided to the medical facility. The central server 200 may be provided in the medical facility.

Figure 2:
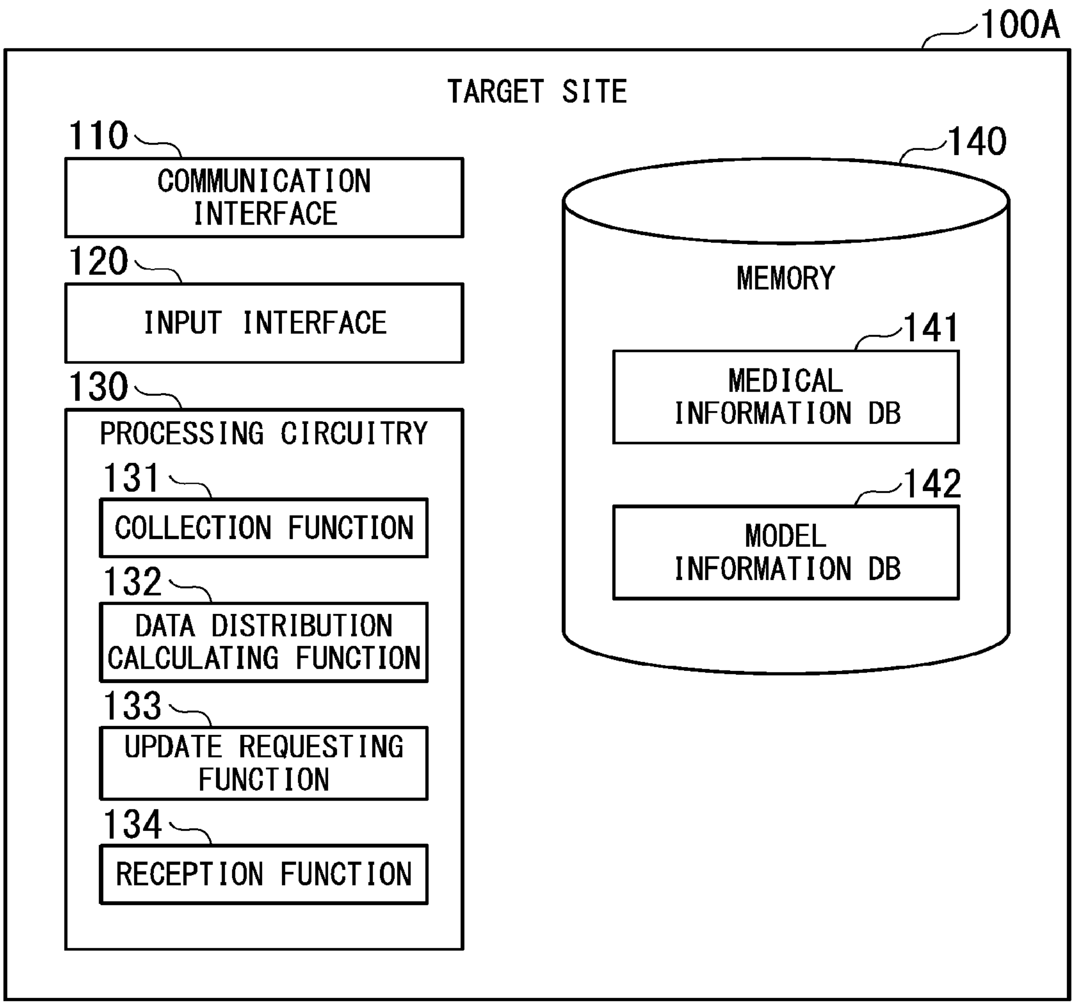
FIG. 2 is a diagram showing a configuration of a target site 100A according to the first embodiment.

FIG. 2 is a diagram showing a configuration of a target site 100A according to the first embodiment. The target site 100A includes, for example, a communication interface 110, an input interface 120, processing circuitry 130, and a memory 140. The communication interface 110 communicates with an external device, for example, the central server 200, via the communication network NW. The communication interface 110 includes, for example, a communication interface such as a network interface card (NIC).

The input interface 120 receives various input operations from an operator and outputs electrical signals indicating details of the received input operations to the processing circuitry 130. The input interface 120 is realized, for example, by a mouse, a keyboard, a touch panel, a drag ball, switches, buttons, a joystick, a camera, an infrared sensor, and a microphone.

The input interface in this specification is not limited to a structure including physical operation components such as a mouse and a keyboard. For example, the input interface may include electrical processing circuitry configured to receive an electrical signal corresponding to an input operation from an external input device provided separately from the device and to output the received electrical signal to a control circuit.

The processing circuitry 130 includes, for example, a processor such as a central processing unit (CPU). The processing circuitry 130 controls the whole operations of the sites 100. The processing circuitry 130 has, for example, a collection function 131, a data distribution calculating function 132, an update requesting function 133, and a reception function 134. For example, the processing circuitry 130 realizes the functions by causing a hardware processor to execute a program stored in a storage device (storage circuitry).

The hardware processor is, for example, circuitry such as a central processing unit (CPU), a graphics processing unit (GPU), an application-specific integrated circuit (ASIC), a programmable logic device (for example, a simple programmable logic device (SPLD) or a complex programmable logic device (CPLD), or a field-programmable gate array (FPGA). Instead of storing a program in the storage device, the program may be directly introduced into a circuit of the hardware processor. In this case, the hardware processor realizes the functions by reading and executing a program introduced into the circuit. The hardware processor is not limited to a configuration of a single circuit, but a plurality of independent circuits may be combined to constitute one hardware processor and to realize the functions. The storage device may be a non-transitory (hardware) storage medium. A plurality of elements may be unified as one hardware processor to realize the functions.

The elements of the processing circuitry 130 may be distributed and realized by a plurality of hardware pieces. The processing circuitry 130 may be realized by a processing device that can communicate with each site 100 instead of any element of the site 100. The functions of the processing circuitry 130 may be distributed to a plurality of circuits and may be available by operating application software stored in the memory 140.

The memory 140 is included in the storage device. A medical information database (hereinafter referred to as DB) 141 and a model information DB 142 are stored in the memory 140. Medical data which is information acquired from medical treatment of patients is included in the medical information DB 141. Examples of factors of the medical data include attributes of a patient such as age, sex, and physique of a patient, a doctor in charge, a disease name, a symptom, a date and time, and a season. Information of a local model (hereinafter referred to as a first model) which is used in a target site 100A and which is operated in a medical facility in which the target site 100A is installed is included in the model information DB 142.

The collection function 131 collects medical data of the first cohort (hereinafter referred to as first medical data) associated with the target site 100A. The first medical data is collected, for example, when a patient is examined or treated in a medical facility in which the target site 100A is installed. The collection function 131 additionally stores the collected first medical data in the first medical data included in the medical information DB 141 of the memory 140. The first medical data is an example of a first data set.

When first data distribution calculation conditions have been satisfied, the data distribution calculating function 132 calculates a first data distribution for a first data set out of data sets based on a first cohort on the basis of the first medical data included in the medical information DB 141 stored in the memory 140. The data distribution calculating function 132 is an example of a data distribution calculating unit. The first data set is, for example, data which is appropriate for updating the first model operated in a medical facility in which a target site is installed and which is data of which a data volume is likely to be insufficient for data for updating the first model when the medical facility is small-scaled.

The data distribution calculating function 132 transmits the calculated first data distribution to the central server 200 via the communication interface 110. The data distribution calculating function 132 transmits an ID which is identification information for identifying the host site along with the first data distribution to the central server 200. The data distribution calculating function 132 may store the calculated first data distribution in the memory 140.

The first data distribution calculation conditions are not particularly limited. For example, the first data distribution calculation conditions may include a condition that first medical data has been newly collected by the collection function 131 of the target site 100A, a condition that the number of pieces of first medical data added to the medical information DB 141 has reached a predetermined number, or a condition that a predetermined period, for example, 10 days, has elapsed.

When first model update conditions included in the model information DB 142 stored in the memory 140 have been satisfied, the update requesting function 133 transmits update request information to the central server 200 via the communication interface 110. When the update request information is transmitted to the central server 200, the update requesting function 133 transmits a first model along with the update request information to the central server. The update requesting function 133 is an example of an update requesting unit.

The first model update conditions are not particularly limited. The first model update conditions may include a condition that an operator performs an input operation for requesting update of the first model on the input interface 120. The first model update conditions may include a condition that a predetermined update period has elapsed. The first model update conditions may include a condition that the number of pieces of newly collected first medical data has reached a predetermined number.

The reception function 134 receives an updated first model which is transmitted from the central server 200. The reception function 134 stores the received updated first model in the memory 140. The target site 100A operates the received updated first model. The reception function 134 is an example of a reception unit.

Figure 3:
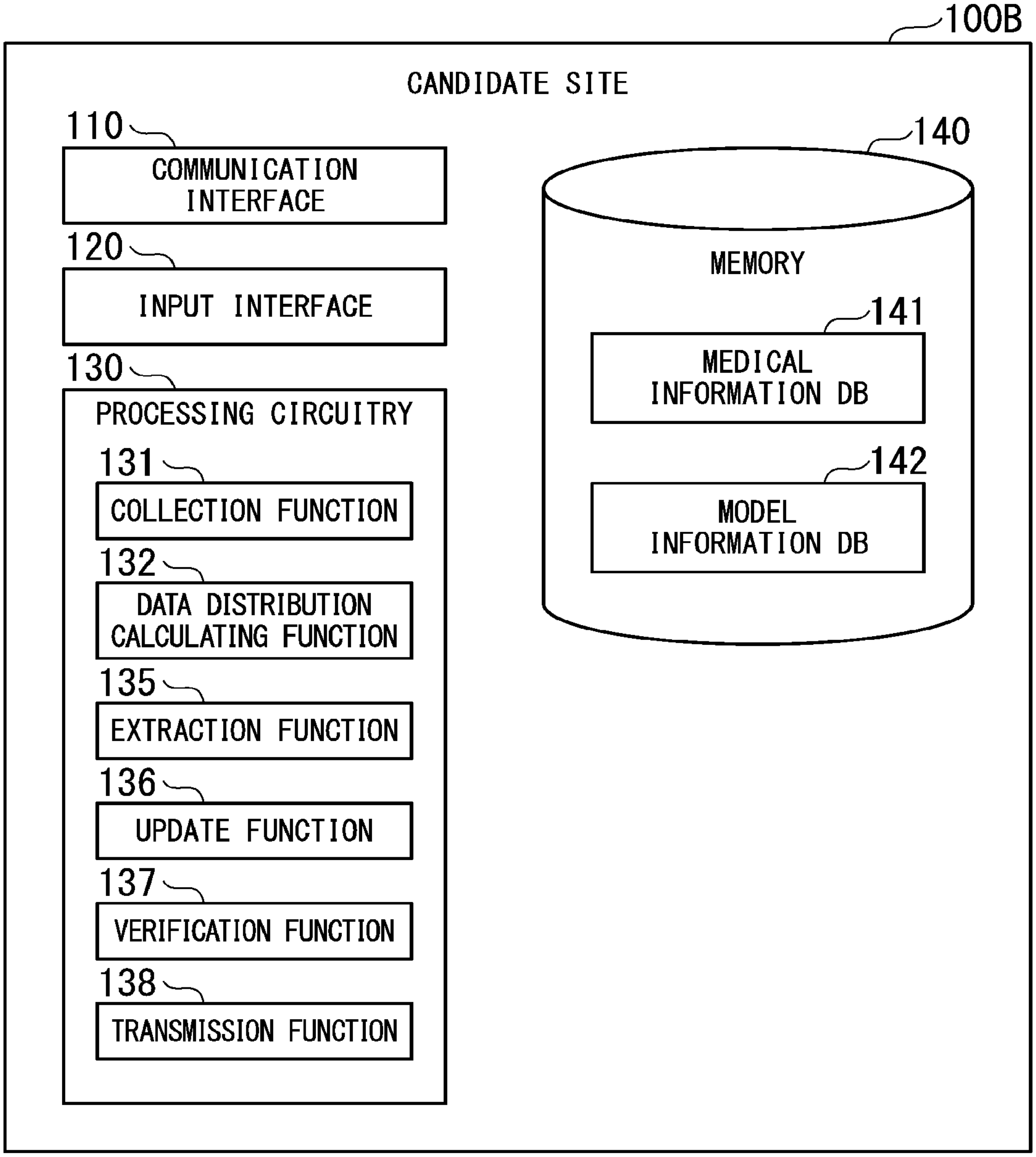
FIG. 3 is a diagram showing a configuration of a candidate site 100B according to the first embodiment.

FIG. 3 is a diagram showing a configuration of a candidate site 100B according to the first embodiment. Similarly to the target site 100A, the candidate site 100B includes a communication interface 110, an input interface 120, processing circuitry 130, and a memory 140. The processing circuitry 130 of the candidate site 100B is different from the processing circuitry of the target site 100A in that the update requesting function 133 is not provided and an extraction function 135, an update function 136, a verification function 137, and a transmission function 138 are provided instead. In the following description, a local model stored as part of the model information DB 142 in the memory 140 of the candidate site 100B is referred to as a second model.

The collection function 131 of the candidate site 100B collects medical data of the second cohort (hereinafter referred to as second medical data) associated with the candidate site 100B. The collection function 131 additionally stores the collected second medical data in the second medical data included in the medical information DB 141 of the memory 140.

The data distribution calculating function 132 of the candidate site 100B calculates a second data distribution for a second data set out of data sets based on a second cohort which is a cohort of the candidate site 100B on the basis of the second medical data included in the medical information DB 141 stored in the memory 140 of the candidate site 100B. The second medical data is an example of the second data set.

The candidate site 100B is a large-scale site, and the target site 100A is a small-scale site. Accordingly, a data volume of factors (features) stored in the memory 140 of the candidate site 100B is larger than a data volume of factors stored in the memory 140 of the target site 100A. The data volume of factors stored in the memory 140 of the target site is a data volume of the first cohort, and the data volume of factors stored in the memory 140 of the candidate site 100B is a data volume of the second cohort.

The data distribution calculating function 132 transmits the calculated second data distribution to the central server 200 via the communication interface 110. The data distribution calculating function 132 transmits an ID of the candidate site 100B and information indicating a data volume of factors (hereinafter referred to as data volume information) stored in the memory 140 along with the second data distribution to the central server 200. The data distribution calculating function 132 may store the calculated second data distribution in the memory 140.

The extraction function 135 extracts a data set which is used to update the first model from the second medical data on the basis of the first data distribution which has been transmitted along with the update request from the central server 200. The data set used to update the first model is part of the second medical data. The data set used to update the first model may be all of the second medical data. The extraction function 135 is an example of an extraction unit.

The update function 136 updates the second model included in the model information DB 142 of the memory 140 of the candidate site 100B and generates an updated second model through learning such as machine learning using the second medical data stored in the memory 140 as training data. The update function 136 stores the generated updated second model as a new second model in the model information DB 142.

The update function 136 updates the first model transmitted from the central server 200 and generates an updated first model through learning such as machine learning in response to the update request from the central server 200. The update function 136 uses at least part of the second medical data stored in the memory 140 as training data. The update function 136 is an example of an update unit.

The verification function 137 verifies the updated first model updated by the update function 136. The verification function 137 uses, for example, a data set other than the data set used to update the first model out of the second medical data to verify the updated first model. The verification function 137 is an example of a verification unit.

The transmission function 138 transmits the updated first model, which has been generated by the update function 136 and has not been verified by the verification function 137, to the central server 200 via the communication interface 110. The transmission function 138 is an example of a transmission unit. The transmission function 138 may transmit the updated first model, which has been generated by the update function 136 and verified by the verification function 137, to the central server 200.

Figure 4:
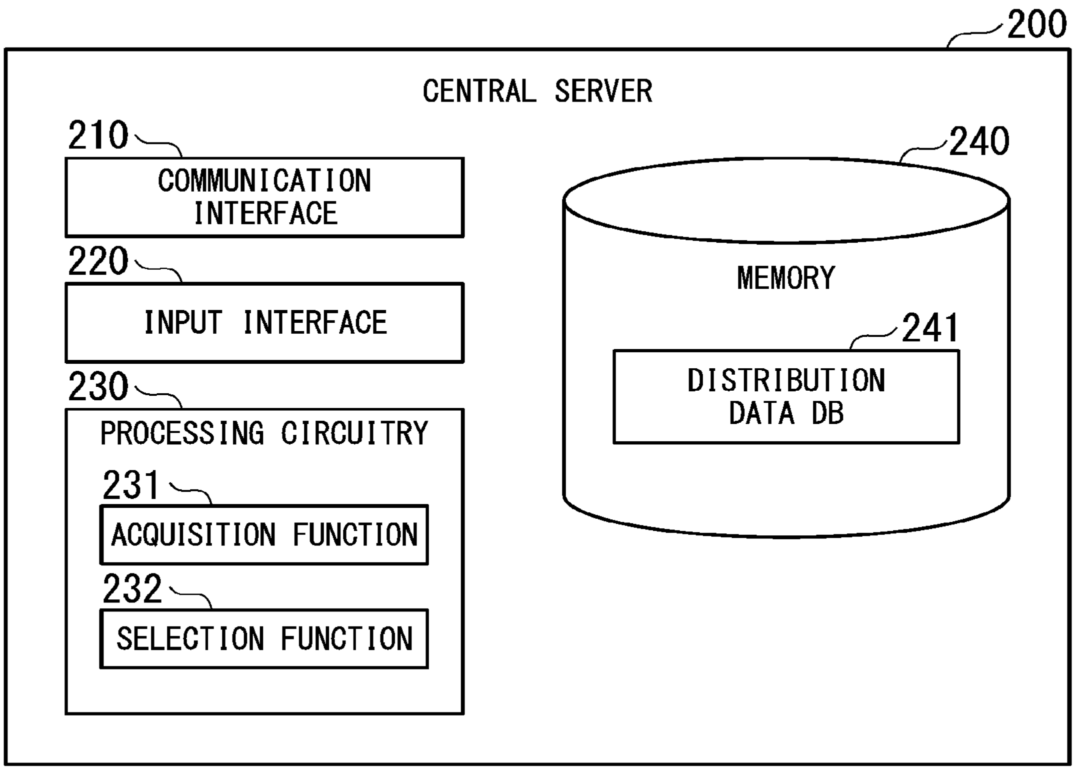
FIG. 4 is a diagram showing a configuration of a central server 200 according to the first embodiment.

FIG. 4 is a diagram showing a configuration of the central server 200 according to the first embodiment. The central server 200 is provided, for example, in a management facility that intensively manages information which is provided by the plurality of sites 100 or provided to the plurality of sites 100. The central server 200 includes, for example, a communication interface 210, an input interface 220, processing circuitry 230, and a memory 240. The communication interface 210 communicates with an external device, for example, the plurality of sites 100, via the communication network NW.

The communication interface 210 includes, for example, a communication interface such as an NIC. Distribution data or a provided model is transmitted from the plurality of sites 100 to the central server 200. Accordingly, a plurality of pieces of distribution data and a plurality of provided models are transmitted to the central server 200. The input interface 220 receives various input operations from an operator and outputs electrical signals indicating details of the received input operations to the processing circuitry 230.

The processing circuitry 230 includes, for example, a processor such as a CPU. The processing circuitry 230 controls the whole operation of the central server 200. The processing circuitry 230 includes, for example, an acquisition function 231 and a selection function 232. The processing circuitry 230 realizes these functions, for example, by causing a hardware processor to execute a program stored in a storage device (storage circuitry).

The elements of the processing circuitry 230 may be distributed and realized by a plurality of hardware pieces. The processing circuitry 230 may be realized by a processing device that can communicate with the central server 200 instead of any element of the central server 200. The functions of the processing circuitry 230 may be distributed to a plurality of circuits and may be available by operating application software stored in the memory of the central server 200. A distribution data DB 241 is stored in the memory 240.

The acquisition function 231 acquires the first data distribution transmitted from the target site 100A and received by the communication interface 110. The acquisition function 231 is an example of an acquisition unit. The acquisition function 231 acquires the second data distribution transmitted from the candidate site 100B.

The acquisition function 231 additionally stores a second data distribution out of the acquired data distribution in the second data distribution included in the distribution data DB 241 of the memory 240. The acquisition function 231 acquires the second distribution data transmitted from a plurality of candidate sites 100B. A plurality of pieces of second distribution data are included in the distribution data DB 241.

The acquisition function 231 may acquire the first data distribution and the second data distribution at any timing. For example, the acquisition function 231 may request the target site 100A and the candidate sites 100B to periodically transmit the data distributions and acquire data distributions transmitted from the sites 100 in response to the request. The central server 200 transmits a global model to the target site 100A and the candidate sites 100B and may transmit a request for transmission of data distributions together at the time of transmitting the global model to the sites 100 and acquire the data distributions transmitted from the sites 100 in response to the request.

When the sites 100 periodically calculate and transmit a data distribution to the central server 200, the acquisition function 231 may acquire the received data distributions. When the sites 100 calculate and transmit a data distribution to the central server 200 at every timing at which medical data is collected, the acquisition function 231 may acquire the received data distributions.

The acquisition function 231 acquires an updated first model which has been selected by the selection function 232 and transmitted from a candidate site 100B (hereinafter referred to as a selected site 300) appropriate for updating the first model operated by the target site 100A. The acquisition function 231 transmits the acquired updated first model to the target site 100A via the communication interface 210.

The selection function 232 selects a selected site 300 out of a plurality of candidate sites 100B on the basis of the first data distribution acquired by the acquisition function 231 and the second distribution data stored in the memory 240. The selection function 232 selects the selected site 300, for example, on the basis of similarity between the first data distribution and the second data distribution. The selection function 232 is an example of a selection unit.

The selection function 232 transmits a model update request for requesting update of the first model to the selected site 300. The selection function 232 transmits the first model transmitted from the target site 100A along with the model update request to the selected site 300 at the time of transmitting the model update request to the selected site 300.

Figure 5:
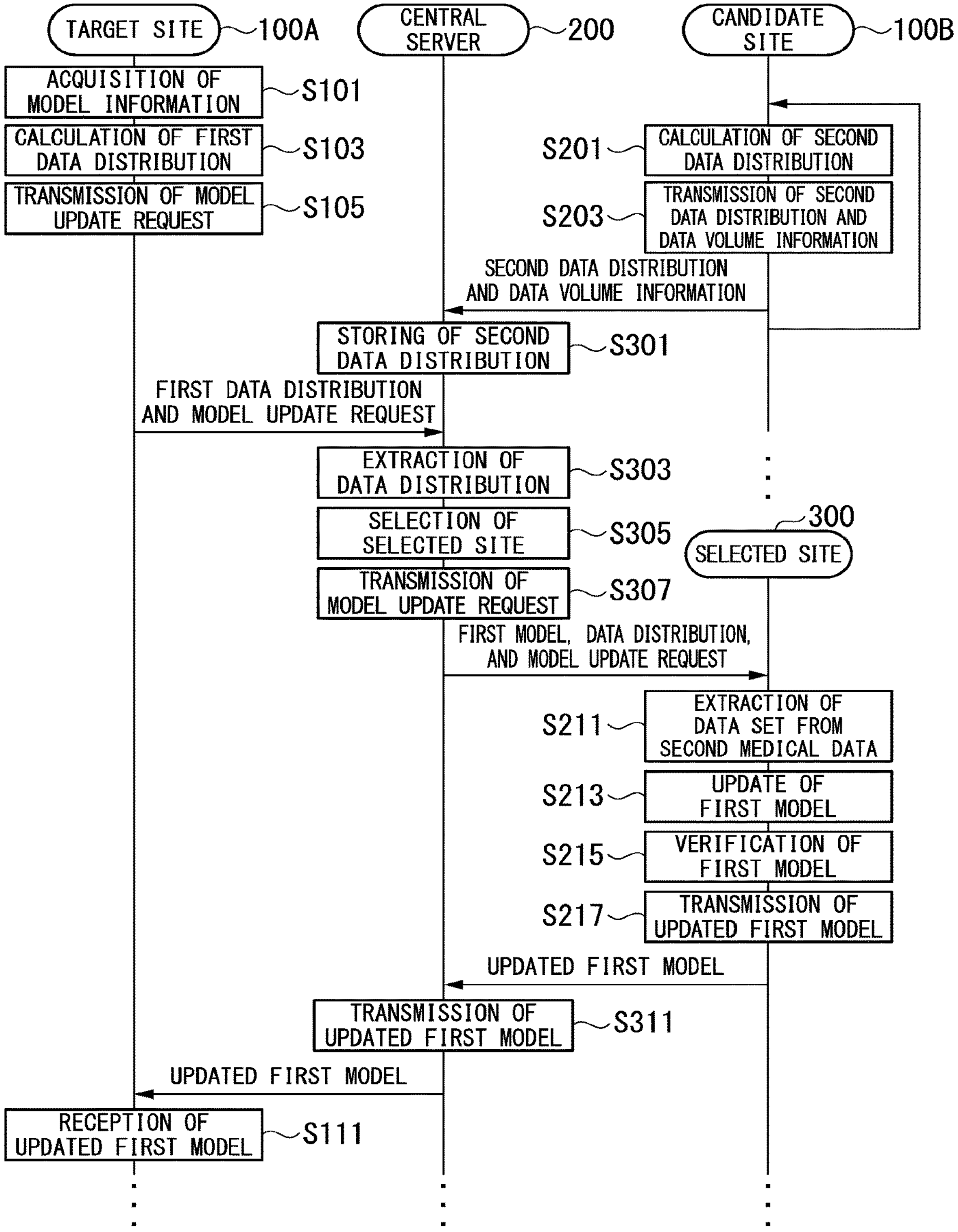
FIG. 5 is a sequence diagram showing a routine of processes that are performed in the learning system 1 according to the first embodiment.

Processes in the learning system 1 will be described below. FIG. 5 is a sequence diagram showing a routine of processes in the learning system 1 according to the first embodiment. In the learning system 1, a target site 100A requests the central server 200 to update a first model, and the central server 200 transmits an updated first model to the target site 100A.

In the processes in the learning system 1, first, the target site 100A extracts and acquires a local model (a first model) in the model information DB 142 stored in the memory 140 as model information using the update requesting function 133 when update conditions of the first model have been satisfied (Step S101).

When the update requesting function 133 acquires the first model, the data distribution calculating function 132 calculates a first data distribution on the basis of first medical data in the medical information DB 141 stored in the memory 140 (Step S103). Subsequently, the update requesting function 133 and the data distribution calculating function 132 transmit the acquired first model and the calculated first data distribution to the central server 200 via the communication interface 110 (Step S105).

On the other hand, when second data distribution calculation conditions have been satisfied, the candidate site 100B calculates a second data distribution on the basis of the second medical data of the medical information DB 141 stored in the memory 140 using the data distribution calculating function 132 (Step S201). The second data distribution calculation conditions are not particularly limited. For example, the second data distribution calculation conditions may include a condition that second medical data has been newly collected by the collection function 131 of the candidate site 100B, a condition that the number of pieces of second medical data added to the medical information DB 141 has reached a predetermined number, or a condition that a predetermined period, for example, 10 days, has elapsed.

The candidate site 100B transmits the second data distribution calculated using the data distribution calculating function 132 to the central server 200. The candidate site 100B transmits data volume information together to the central server 200 at the time of transmitting the second data distribution (Step S203). The candidate site 100B repeatedly performs the processes of Steps S201 to S203 whenever the second data distribution calculation conditions are satisfied. The central server 200 additionally stores the second data distribution transmitted from the candidate site 100B in the second data distribution included in the distribution data DB 241 of the memory 240 (Step S301).

The central server 200 having received a model update request extracts a plurality of second data distributions of the distribution data DB 241 stored in the memory 240 using the selection function 232 (Step S303). Subsequently, the selection function 232 selects a selected site 300 out of a plurality of candidate sites 100B on the basis of the first data distribution transmitted from the target site 100A (Step S305). In selecting the selected site 300, the selection function 232 compares the first data distribution transmitted from the target site 100A with a plurality of second data distributions transmitted from the plurality of candidate sites 100B. The selection function 232 selects the candidate site 100B having transmitted the second data distribution closest to the first data distribution out of the plurality of second data distributions as the selected site 300 out of the plurality of candidate sites 100B.

Figure 6:
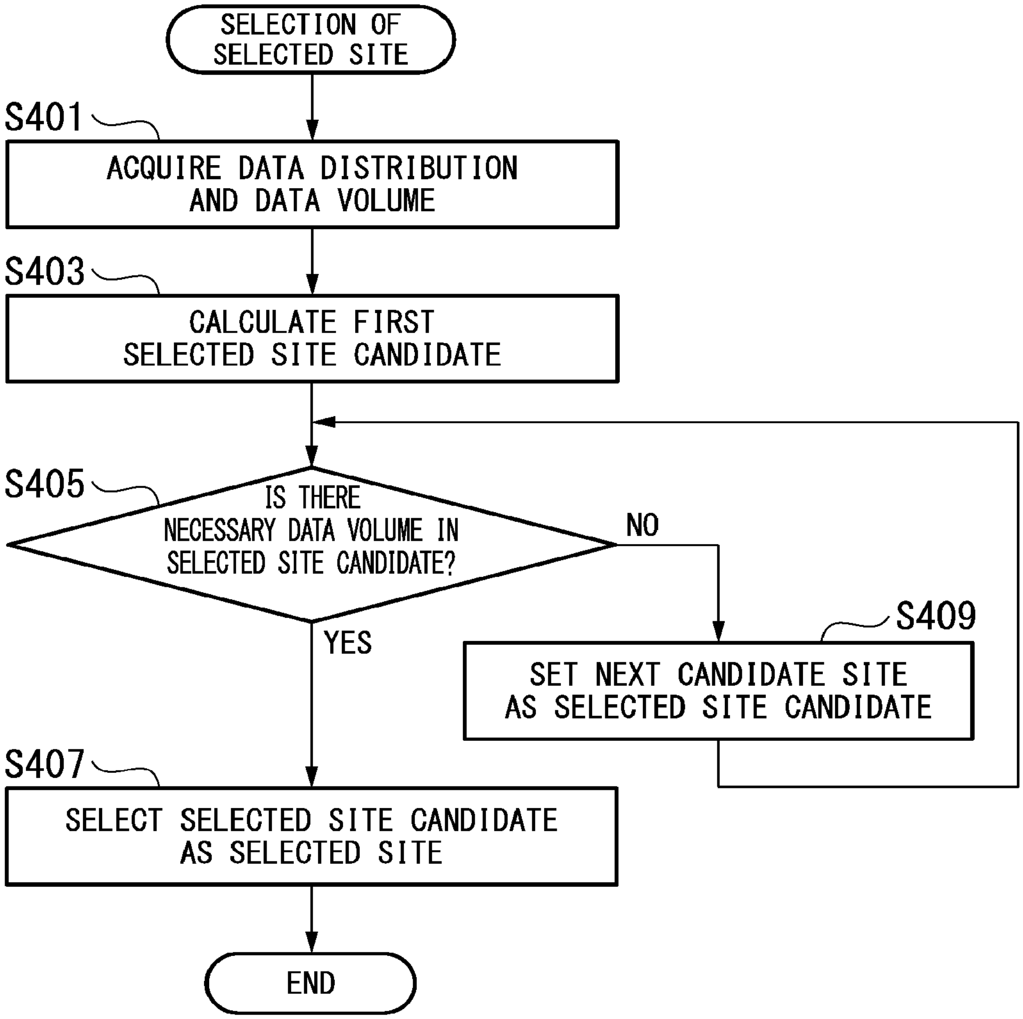
FIG. 6 is a flowchart showing a routine of selecting a selected site 300 according to the first embodiment.

FIG. 6 is a flowchart showing a routine of selecting a selected site 300 according to the first embodiment. The selection function 232 acquires a first data distribution, second data distributions of a plurality of candidate sites 100B, and a data volume which can be used to update a first model of the plurality of candidate sites 100B (Step S401).

Figure 7:
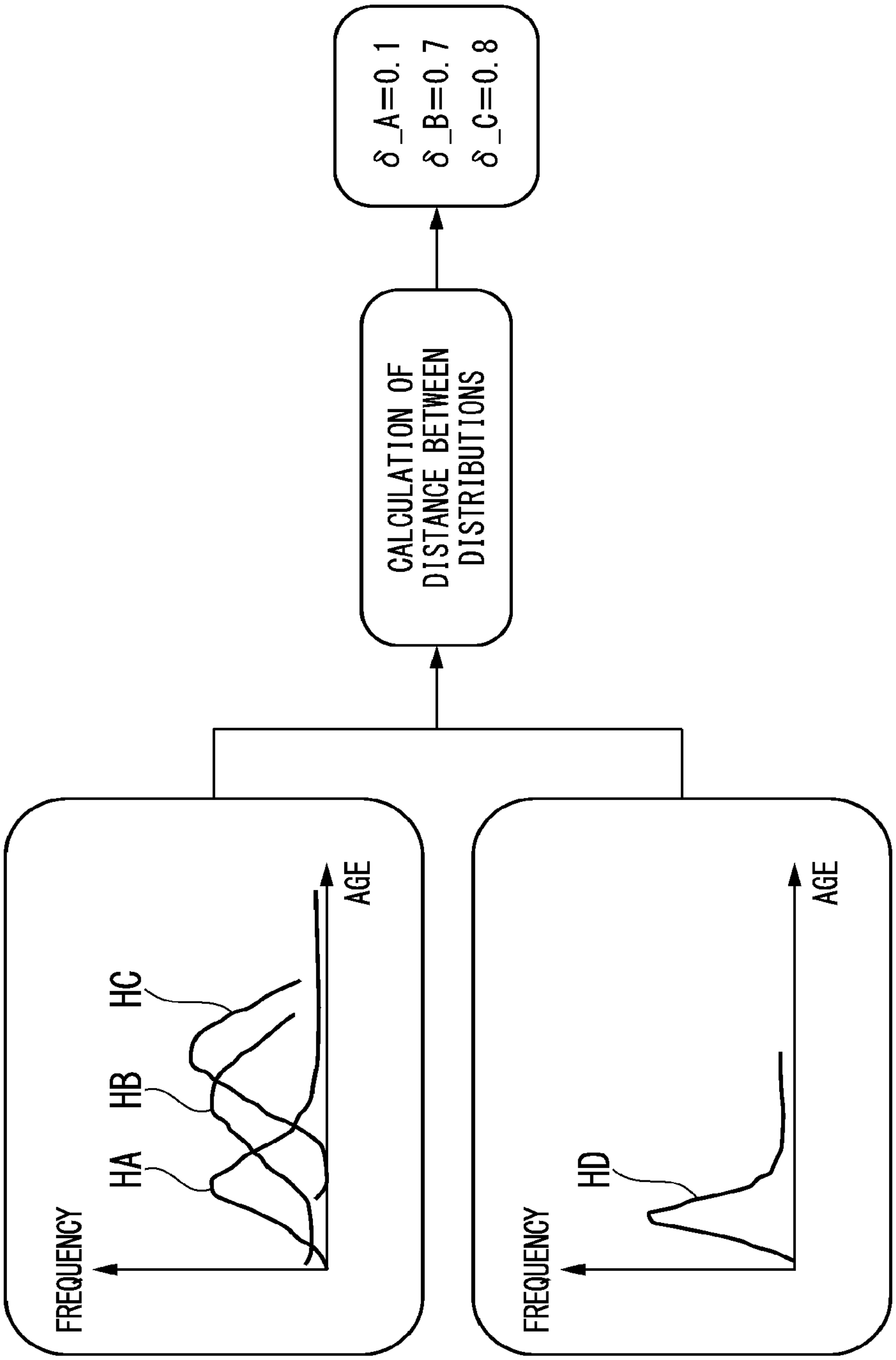
FIG. 7 is a diagram showing a state in which a selected site 300 is selected according to the first embodiment.

Subsequently, the selection function 232 compares the first data distribution and the second data distributions of a plurality of selected site candidates and calculates a candidate site 100B with the second data distribution closest to the first data distribution as a first selected site candidate (Step S403). The selection function 232 uses, for example, KL divergence to calculate the first selected site candidate. FIG. 7 is a diagram showing a state in which selected site candidates are selected according to the first embodiment. Here, each of the first data distribution and the second data distribution is a distribution in which one (age in this example) of a plurality of types of factors is represented as a histogram.

First to third large-scale histograms HA to HC and a small-scale histogram in FIG. 7 are histograms in which the horizontal axis represents ages of samples and the vertical axis represents frequency. The first large-scale histogram HA represents the second data distribution of a first candidate site 100B-1, the second large-scale histogram HB represents the second data distribution of a second candidate site 100B-2, and the third large-scale histogram HC represents the second data distribution of a third candidate site 100B-3. The small-scale histogram HD represents the first data distribution of the target site 100A.

The selection function 232 of performing KL divergence calculates index values $\delta(p^1, p^2)$ between the first to third large-scale histograms HA to HC and the small-scale histogram HD using Expression (1). The index values $\delta(p^1, p^2)$ indicate distances between the first to third large-scale histograms HA to HC and the small-scale histogram HD.

$$\delta(p^1, p^2) = p^1(\xi)\log\frac{p^1(\xi)}{p^2(\xi)}d\xi \tag{1}$$

In Expression (1), $p^1$ is a probability density function of the first data distribution, $p^2$ is a probability density function of the second data distribution, and $\xi$ is a variable of a probability density function for each factor.

The selection function 232 calculates the index values $\delta(p^1, p^2)$ of a plurality of factors using Expression (1), calculates a sum of the calculated index values $\delta(p^1, p^2)$, and sets the sum as the index values δ of the candidate sites 100B. After calculating the index value δ of one candidate site 100B, the selection function 232 calculates the index values δ of other candidate sites 100B using Expression (1). For example, a first index value δ_A is the index value calculated for the first candidate site 100B-1, a second index value δ_B is the index value calculated for the second candidate site 100B-2, and a third index value δ_C is the index value calculated for the third candidate site 100B-3. The selection function 232 calculates the first selected site candidate based on Expression (2) using the calculated index values of a plurality of sites.

$$\text{Selected Site} = \underset{j}{\operatorname{argmin}}\sum_{i=1}^{N}\delta\left(p_i^{S_j}, p_i^{\hat{S}}\right) \tag{2}$$

In Expression (2), N is the number of types of factors in the corresponding candidate site 100B, $S_j$ denotes the corresponding candidate site 100B, j denotes an identifier (ID) of the corresponding candidate site 100B, and S^ denotes the target site. The index value δ calculated for each candidate site 100B has a relationship indicating similarity to the first data distribution. For example, as the index value δ of a candidate site 100B decreases, the similarity between the second data distribution and the first data distribution for the candidate site 100B increases.

In the example shown in FIG. 7, the first index value δ_A of the first candidate site 100B-1 is 0.1, the second index value δ_B of the second candidate site 100B-2 is 0.7, and the third index value δ_C of the third candidate site 100B-3 is 0.8. In this case, the second data distribution of the first candidate site 100B-1 has the highest similarity to the first data distribution. The similarity between the second data distribution and the first data distribution increases in the order of the second candidate site 100B-2 and the third candidate site 100B-3. As a result, the selection function 232 calculates the first candidate site 100B-1 as the first selected site candidate.

Subsequently, the selection function 232 determines whether the first selected site candidate, that is, the first candidate site 100B-1, has a data volume required for updating the first model (hereinafter referred to as a required data volume) (Step'S405). When it is determined that the first selected site candidate has the required data volume, the selection function 232 selects the first selected site candidate as the selected site 300 (Step S407) and ends the routine shown in FIG. 6.

When it is determined that the first selected site candidate does not have the required data volume, the selection function 232 sets a next candidate site, that is, the second candidate site 100B-2, as the selected site candidate (Step S409) and causes the routine to proceed to Step S405. Then, the selection function 232 causes the routine to proceed to Steps S405 to S409, selects the selected site candidate determined to have the required data volume in Step S405 as the selected site 300, and ends the routine shown in FIG. 6.

Referring back to FIG. 5, the selection function 232 transmits a model update request to the selected site 300 (Step S307). The selection function 232 transmits the first data distribution and the first model along with the model update request at the time of transmitting the model updating request to the selected site 300.

The selected site 300 which has been selected out of the plurality of candidate sites 100B and which has received the model update request extracts a data set which is used to update the first model from the second medical data using the extraction function 135 (Step S211). Subsequently, the update function 136 updates the first model transmitted from the central server 200 by learning such as machine learning using the second medical data as training data (Step S213). Subsequently, the verification function 137 verifies the updated first model generated by updating the first model using the update function 136 (Step S215).

Subsequently, the transmission function 138 of the selected site 300 transmits the updated first model verified by the verification function 137 to the central server 200 (Step S217). Then, the central server 200 transmits the updated first model transmitted from the selected site 300 to the target site 100A without any change (Step S311). The target site 100A receives the updated first model transmitted from the central server 200 using the reception function 134 (Step S111). In this way, the learning system 1 ends the routine shown in FIG. 5.

In the learning system 1 according to the first embodiment, the first model which is operated in the target site 100A is updated in the candidate site 100B. Accordingly, it is possible to update the first model using the second data set based on the second cohort in the candidate site 100B. Here, the second data set of the second data distribution similar to the first data distribution is used to update the first model. Accordingly, it is possible to enhance accuracy of the first model (model).

Second Embodiment

Figure 8:
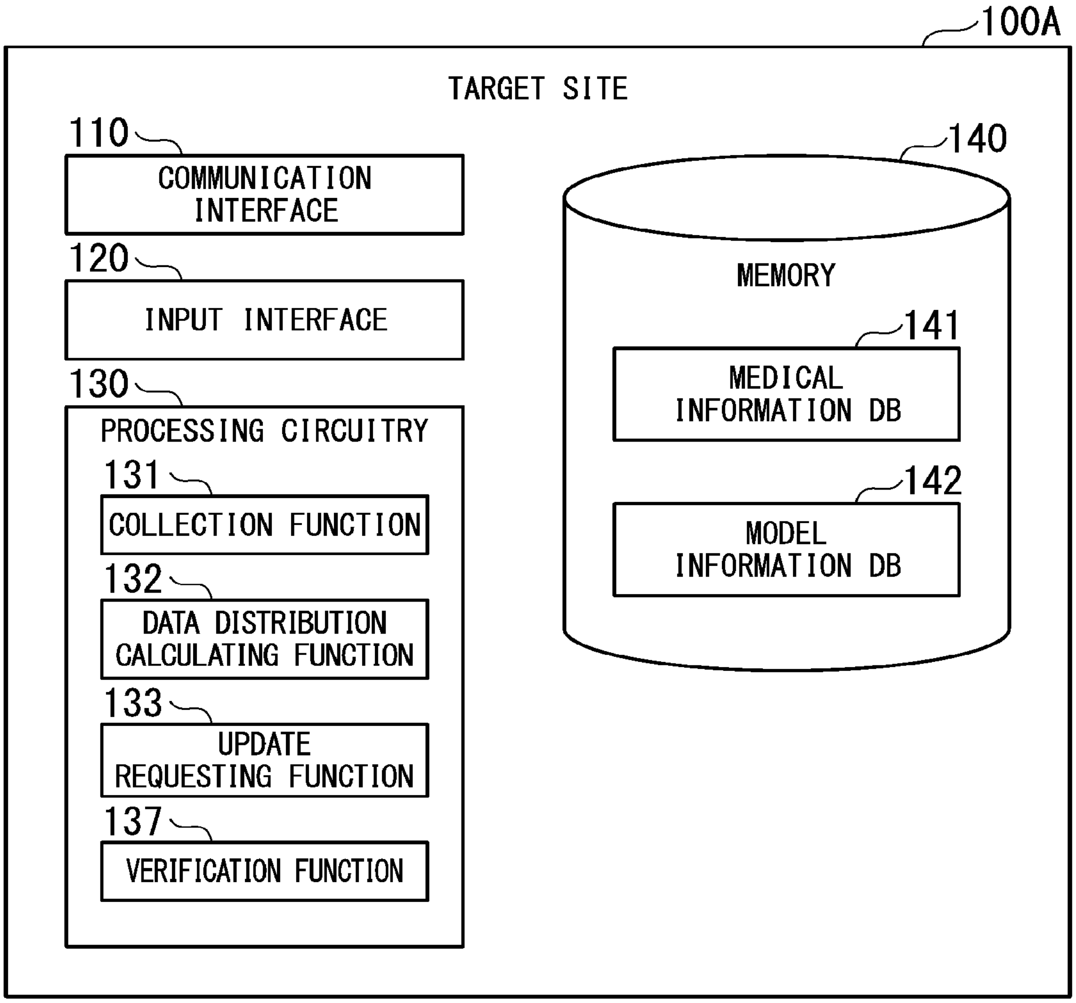
FIG. 8 is a block diagram showing a target site 100A of a learning system according to a second embodiment.

A second embodiment will be described below. FIG. 8 is a block diagram showing a target site 100A in a learning system according to the second embodiment. The learning system according to the second embodiment is different from the learning system 1 according to the first embodiment, in that a verification function 137 is provided in the processing circuitry 130 of a target site 100A.

In the learning system 1 according to the second embodiment, similarly to the first embodiment, a central server 200 selects a selected site 300 on the basis of a first data distribution and a second data distribution and transmits a first model to the selected site 300. The selected site 300 generates an updated first model by updating the first model on the basis of the received first model and second medical data stored in a memory 140 and transmits the generated updated first model to the central server 200. The central server 200 transmits the received updated first model to the target site 100A.

A collection function 131 in the target site 100A stores first medical data (hereinafter referred to as new first medical data) which is collected after an update requesting function 133 has transmitted the first model to the central server 200 in the memory 140. The verification function 137 verifies an aptitude of the updated first model, which has been updated and generated by an update function 136 of the selected site 300, to a first cohort.

The verification function 137 receives the updated first model transmitted from the central server 200 via a communication interface 110. The verification function 137 verifies the received updated first model using the new first medical data stored in the memory 140. The verification function 137 is an example of a verification unit.

With the learning system according to the second embodiment, it is possible to achieve the same operations and advantages as in the learning system 1 according to the first embodiment. The learning system according to the second embodiment verifies the updated first model generated by the selected site 300 using the new first medical data. Accordingly, it is possible to determine an aptitude when the updated first model is used in the host site.

Third Embodiment

A third embodiment will be described below. A learning system according to the third embodiment further includes a plurality of management target sites 100D as the sites 100. A central server 200 transmits and distributes a first model which is operated in the plurality of management target sites 100D to the management target sites 100D. The central server 200 manages update of the first model in the management target sites 100D and request a selected site 300 selected out of a plurality of candidate sites 100B to update the first model when the first model is updated.

Figure 9:
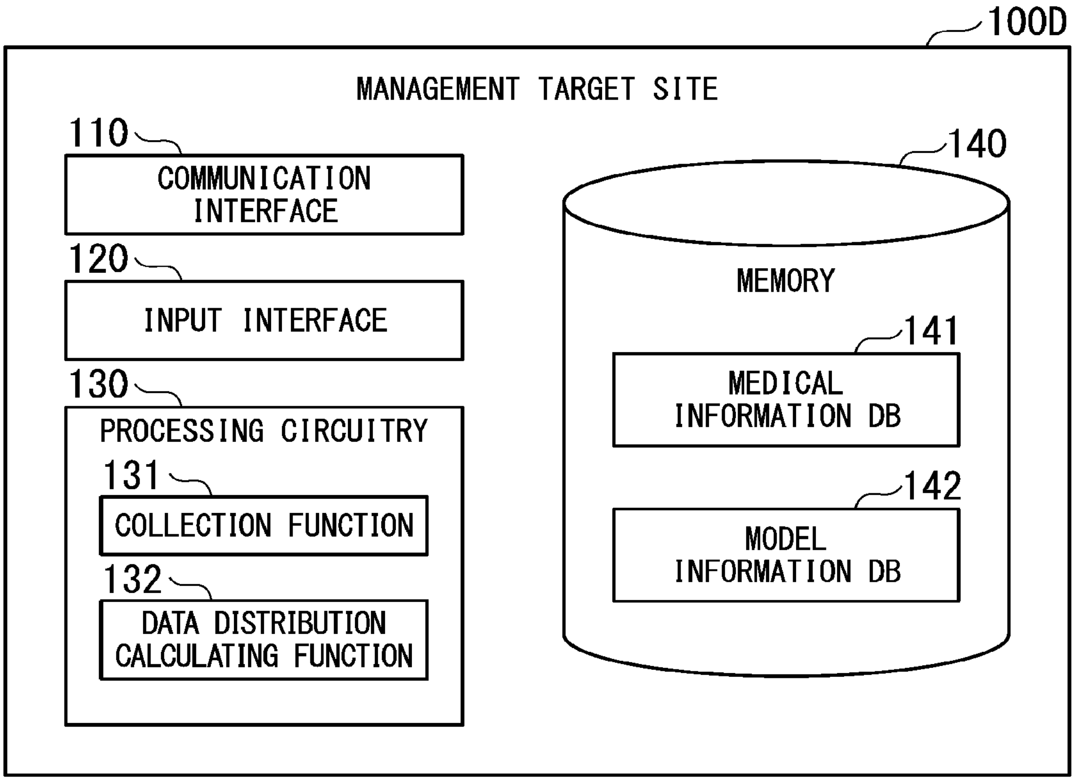
FIG. 9 is a diagram showing a configuration of a management target site 100D.
Figure 10:
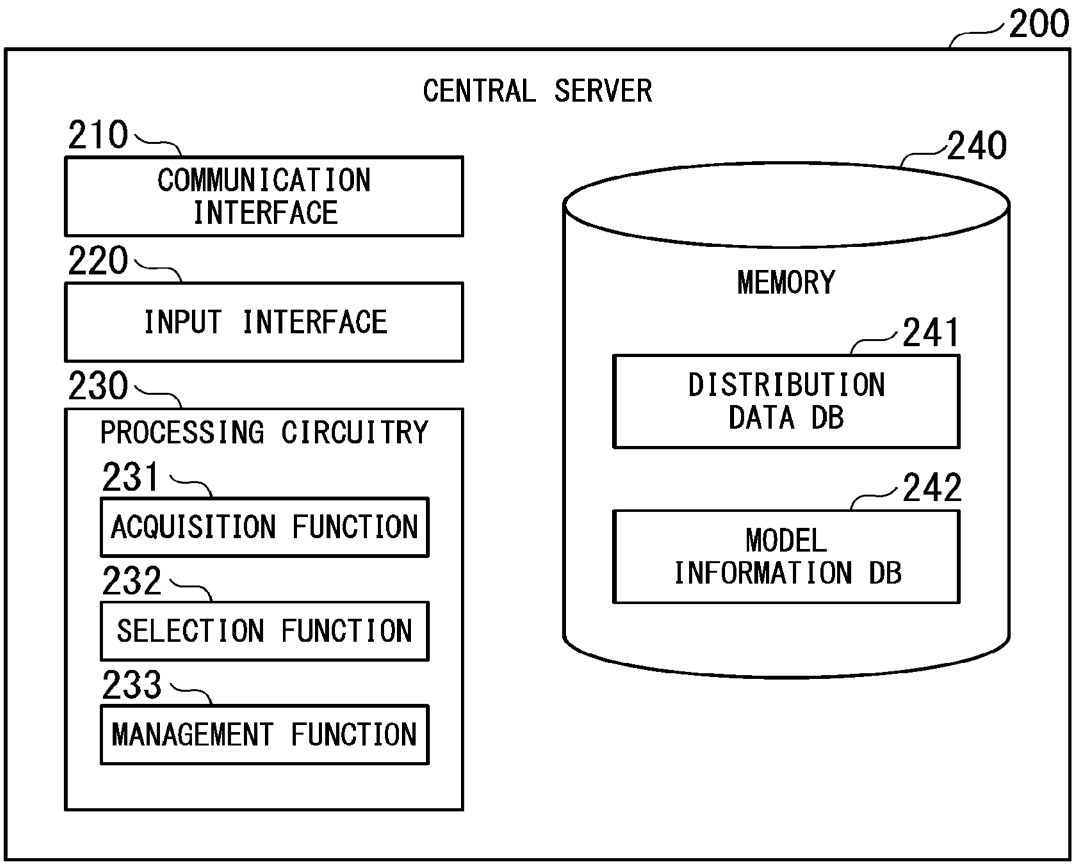
FIG. 10 is a diagram showing a configuration of a central server 200 according to a third embodiment.

FIG. 9 is a diagram showing a configuration of a management target site 100D. FIG. 10 is a diagram showing a configuration of the central server 200 according to the third embodiment. Similarly to the target site 100A or the candidate site 100B according to the first embodiment, the management target site 100D includes, for example, a communication interface 110, an input interface 120, processing circuitry 130, and a memory 140. The processing circuitry 130 of the management target site 100D has a collection function 131 and a data distribution calculating function 132, but does not have an update requesting function or an update function.

Similarly to the central server according to the first embodiment, the central server 200 according to the third embodiment includes, for example, a communication interface 210, an input interface 220, processing circuitry 230, and a memory 240. The processing circuitry 230 of the central server 200 according to the third embodiment has, for example, an acquisition function 231, a selection function 232, and a management function 233. The acquisition function 231 and the selection function 232 are the same functions as in the first embodiment.

The management function 233 manages a first model in a plurality of management target sites 100D. The management function 233 updates the first model in each of the plurality of management target sites 100D according to necessity as part of management of the first model. The management function 233 identifies a target site 100A in which the first model is to be updated out of the plurality of management target sites 100D.

Figure 11:
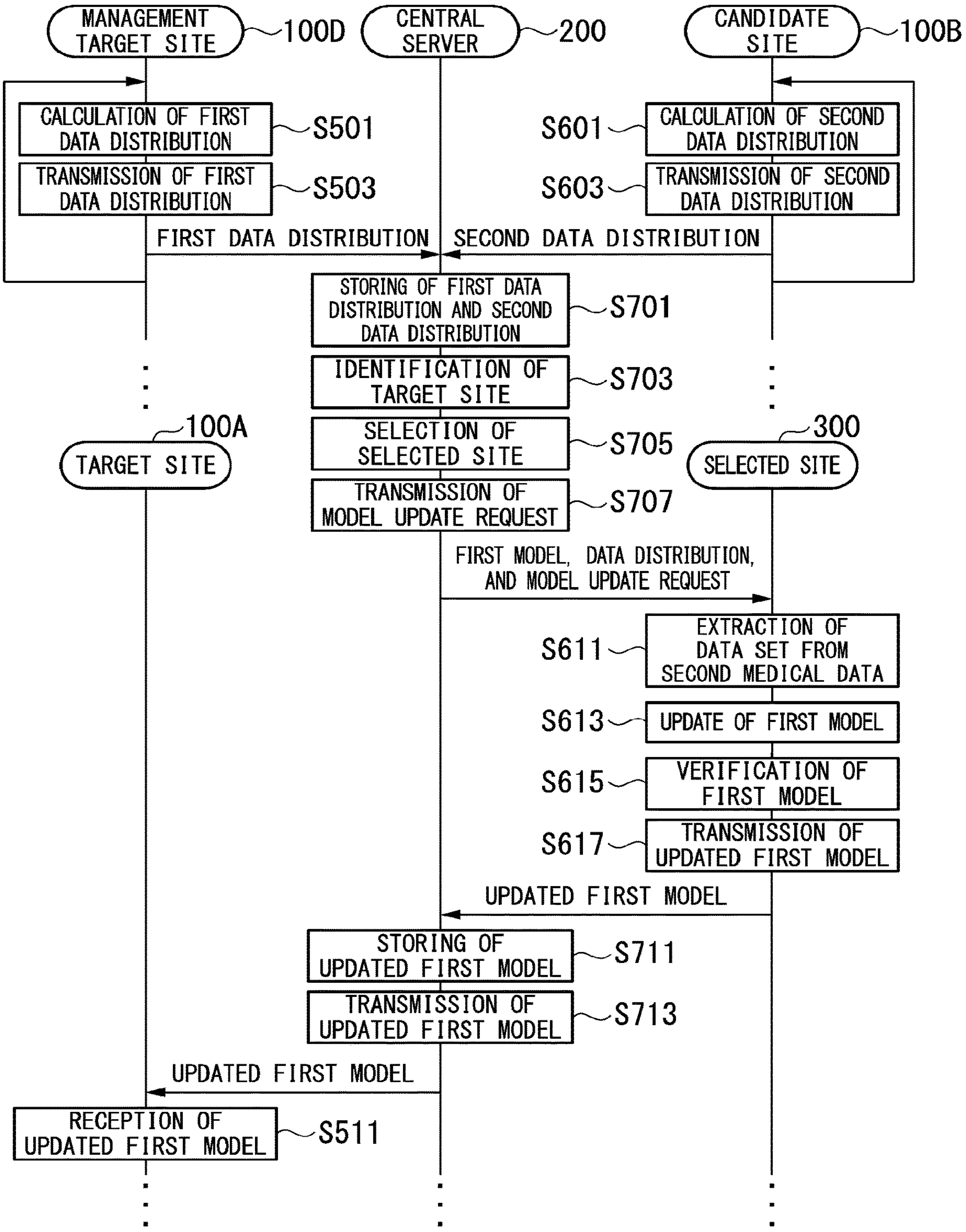
FIG. 11 is a sequence diagram showing a routine of processes that are performed in a learning system according to the third embodiment.

Processes in the learning system according to the third embodiment will be described below. FIG. 11 is a sequence diagram showing a routine of processes in the learning system according to the third embodiment. In the processes in the learning system 1, first, a management target site 100D calculates a first data distribution on the basis of first medical data stored in a medical information DB 141 using a data distribution calculating function 132 when first data distribution calculation conditions have been satisfied (Step S501).

Subsequently, the data distribution calculating function 132 transmits the calculated first data distribution to the central server 200 via the communication interface 110 (Step S503). The management target site 100D repeatedly performs the processes of Steps S501 and S503 whenever the first data distribution calculation conditions are satisfied.

On the other hand, when second data distribution calculation conditions have been satisfied, a candidate site 100B calculates a second data distribution on the basis of second medical data stored in the medical information DB 141 using the data distribution calculating function 132 (Step S601). The second data distribution calculation conditions are the same as in the first embodiment. Subsequently, the data distribution calculating function 132 transmits the calculated second data distribution to the central server 200 (Step S603). The candidate site 100B repeatedly performs the processes of Steps S601 and S603 whenever the second data distribution calculation conditions are satisfied.

The central server 200 stores the first data distribution transmitted from the management target site 100D and the second data distribution transmitted from the candidate site 100B in the distribution data DB 241 (Step S701). Subsequently, the central server 200 identifies a target site in which target site identification conditions have satisfied (Step S703).

The target site identification conditions are not particularly limited. For example, the target site identification conditions may include a condition that the first data distribution transmitted from the management target site 100D is received, a condition that the number of received first data distributions has reached a predetermined number, or a condition that a predetermined period has elapsed. The target site identification conditions are determined for each of the plurality of management target sites 100D, and the central server 200 identifies a management target site 100D in which the target site identification conditions have been satisfied as a target site 100A.

Subsequently, the selection function 232 selects a selected site 300 out of a plurality of candidate sites 100B on the basis of the first data distribution transmitted from the identified target site 100A (Step S705). The routine of selecting the selected site 300 is the same as in the first embodiment. Subsequently, the selection function 232 transmits a model update request to the selected site 300 (Step S707). The selection function 232 transmits the first model of the identified target site 100A along with the model update request at the time of transmitting the model update request to the selected site 300.

The selected site 300 having received the model update request extracts second medical data stored in the memory 140 using the extraction function 135 (Step S611). Subsequently, the update function 136 updates a first model transmitted from the central server 200 by learning such as machine learning using the second medical data as training data (Step S613). Subsequently, the verification function 137 verifies an updated first model which is generated by updating the first model using the update function 136 (Step S615).

Subsequently, the transmission function 138 in the selected site 300 transmits the updated first model verified by the verification function 137 to the central server 200 (Step S617). The central server 200 receives the updated first model transmitted from the selected site 300 and stores the received updated first model in the memory 240 (Step S711). Subsequently, the central server 200 transmits the received updated first model to the target site 100A identified in Step S703 (Step S713). The target site 100A receives the updated first model transmitted from the central server 200 using the reception function 134 (Step S511). In this way, the learning system ends the routine shown in FIG. 11.

With the learning system according to the third embodiment, it is possible to achieve the same operations and advantages as in the learning system 1 according to the first embodiment. In the learning system according to the third embodiment, the central server 200 manages a first model which is operated in a plurality of management target sites 100D such as a plurality of small-scale sites and transmits an updated first model to the management target sites 100D. At this time, since a selected site 300 such as a large-scale site is requested to update the first model, it is possible to accurately update a model of a management target site.

In the aforementioned embodiment, the update requesting function 133 is provided in a target site 100A, and the update function 136 is provided in candidate sites 100B. On the other hand, regardless of the magnitude in scale of the sites 100, at least one of the update requesting function 133 and the update function 136 may be provided in the sites 100.

For example, the target site 100A may have an update function and be able to update the first model in the host site in addition to receiving the updated first model. In this case, the timing at which the target site 100A transmits the first data distribution to the central server 200 may be set to a timing at which the updated first model is transmitted to the central server 200.

In the aforementioned embodiment, the first data distribution is transmitted to the selected site 300 via the central server 200 and the updated first model is transmitted to the target site 100A via the central server 200, but information may be transmitted and received between the sites without using the central server 200. For example, the target site 100A may include a reception unit having a data distribution calculating function and a selection function and configured to transmit the first data distribution to the selected site 300 and to receive an updated first model transmitted from the selected site 300. In this case, the selected site 300 may have an acquisition function of acquiring a first data distribution, an update function of generating an updated first model by updating a first model, and a transmission function of transmitting the updated first model to the target site 100A.

In the second embodiment, the verification function 137 is provided in a target site 100A having the update requesting function 133. On the other hand, the verification function may be provided in a candidate site 100B having the update function 136. In this case, the target site 100A may transmit at least one of the first medical data and the first data distribution to the candidate site 100B.

In the aforementioned embodiment, the target site 100A transmits the first data distribution to the central server 200 and the central server selects a selected site 300 by comparing the first data distribution and the second data distribution, but an increase of the first data distribution may be used instead of or in addition to the first data distribution. In this case, an increase of the second data distribution may be used to select the selected site 300 instead of or in addition to the second data distribution. The increase of the first data distribution may be calculated by the target site 100A and transmitted to the central server 200 or may be calculated by the central server 200. Similarly, the increase of the second data distribution may be calculated by the candidate site 100B and transmitted to the central server 200 or may be calculated by the central server 200.

According to at least one of the aforementioned embodiments, since the acquisition unit configured to acquire a first data distribution associated with a first data set out of data sets based on a first cohort, a selection unit configured to select a second cohort which is used to update a first model out of a plurality of second cohorts on the basis of the first data distribution acquired by the acquisition unit, and an update unit configured to update the first model on the basis of at least part of a second data set out of data sets based on the selected second cohort are provided, it is possible to enhance accuracy of a model.

While some embodiments have been described above, these embodiments are provided as examples and are not intended to limit the scope of the present invention. These embodiments can be realized in various other forms, and various omissions, substitutions, and modifications can be added thereto without departing from the gist of the present invention. These embodiments and modifications thereof are included in the scope or gist of the present invention and are also included in the inventions described in the appended claims and equivalent scopes thereof.

What is claimed is:

1. A medical learning system comprising:

processing circuitry;

a model information database; and a medical information database storing first medical data and second medical data, wherein the processing circuitry is configured to:

acquire a first data distribution for a first data set that is the first medical data out of data sets based on a first cohort associated with a target site of a medical facility;

select a second cohort that is used to update a first model that is used in the target site and stored in the model information database out of a plurality of second cohorts on the basis of the acquired first data distribution, the second cohort being associated with a candidate site of another medical facility;

update the first model on the basis of a second data set that is the second medical data out of data sets based on the selected second cohort;

calculate a similarity between the first data distribution and each second data distribution for the second data set based on each of the plurality of second cohorts by calculating distances between the first data distribution and each second data distribution, each of the first data distribution and the second data distribution being a distribution in which factors of medical data are represented as a histogram;

select the second cohort of the second data distribution having the highest similarity from the plurality of second cohorts;

determine whether or not the second data set based on the selected second cohort has a data volume required for updating the first model; and update the first model on the basis of the second data set based on the selected second cohort when determining that the second data set based on the selected second cohort has the data volume required for updating the first model.

2. The medical learning system according to claim 1, wherein a data volume of the data sets based on the second cohort is greater than a data volume of the data sets based on the first cohort.

3. The medical learning system according to claim 1, wherein the processing circuitry is further configured to verify an aptitude of the updated first model to the first cohort.

4. The medical learning system according to claim 1, wherein each of the first data distribution and the second data distribution is a distribution in which at least one of attributes of a patient, a doctor in charge, a disease name, a symptom, a date and time, or a season, each of which is a factor of the medical data, and their frequency are represented as a histogram.

5. The medical learning system according to claim 1, wherein each of the first data distribution and the second data distribution is a distribution in which age of a patient, which is a factor of the medical data, and its frequency are represented as a histogram.

6. The medical learning system according to claim 1, wherein the processing circuitry is further configured to:

when determining that the second data set based on the selected second cohort does not have the data volume required for updating the first model, select, from the plurality of second cohorts, another second cohort which is different form the second cohort of the second data distribution having the highest similarity, the another second cohort having the second highest similarity;

determine whether or not the second data set based on the selected another second cohort has a data volume required for updating the first model; and update the first model on the basis of the second data set based on the selected another second cohort when determining that the second data set based on the selected another second cohort has the data volume required for updating the first model.

7. A medical learning system comprising:

a plurality of sites configured to collect a data set based on a cohort and to operate a trained model; and a central server configured to acquire a data distribution of the data set collected by each of the plurality of sites, wherein the plurality of sites comprise a first site and a second site, wherein the first site comprises:

processing circuitry;

a model information database; and a medical information database storing first medical data, wherein the processing circuitry is configured to:

calculate a first data distribution for a first data set that is the first medical data, out of data sets based on a first cohort associated with the first site, wherein the second site comprises:

first processing circuitry; and a medical information database storing second medical data, wherein the first processing circuitry is configured to:

update a first model that is stored in the model information database in the first site on the basis of at least part of a second data set that is the second medical data based on a second cohort associated with the second site, wherein the central server comprises:

second processing circuitry; and a distribution database, wherein the second processing circuitry is configured to:

acquire the calculated first data distribution and store the first data distribution in the distribution database;

calculate a similarity between the first data distribution and each second data distribution for the second data set based on each of the plurality of second cohorts by calculating distances between the first data distribution and each second data distribution, each of the first data distribution and the second data distribution being a distribution in which factors of medical data are represented as a histogram;

select the second cohort of the second data distribution having the highest similarity from the plurality of second cohorts; and determine whether or not the second data set based on the selected second cohort has a data volume required for updating the first model, and wherein the first processing circuitry is configured to update the first model on the basis of the second data set based on the selected second cohort when it is determined that the second data set based on the selected second cohort has the data volume required for updating the first model.

8. The medical learning system according to claim 7, wherein the first site is configured to request the central server to update the first model.

9. A learning device that is comprised in a second site of a medical facility, the learning device comprising:

processing circuitry; and a medical information database storing second medical data, wherein the processing circuitry is configured to:

extract a data set that is used for updating, out of a second data set that is the second medical data, of data based on a second cohort associated with the second site on the basis of a first data distribution which is calculated by a first site of another medical facility and which is associated with a first data set that is a first medical data used to train a first model out of data sets based on a first cohort, the first model being used in the first site and stored in a model information database;

update the first model on the basis of at least part of the second data set based on the second cohort associated with the second site;

transmit the updated first model to the first site;

calculate a similarity between the first data distribution and each second data distribution for the second data set based on each of the plurality of second cohorts by calculating distances between the first data distribution and each second data distribution, each of the first data distribution and the second data distribution being a distribution in which factors of medical data are represented as a histogram;

select the second cohort of the second data distribution having the highest similarity from the plurality of second cohorts;

determine whether or not the second data set based on the selected second cohort has a data volume required for updating the first model; and update the first model on the basis of the second data set based on the selected second cohort when determining that the second data set based on the selected second cohort has the data volume required for updating the first model.

10. A learning method that uses a model information database and a medical information database storing first medical data and second medical data and is performed by a computer, the learning method comprising:

acquiring a first data distribution for a first data set that is the first medical data, out of data sets based on a first cohort associated with a target site of a medical facility;

selecting a second cohort that is used to update a first model that is used in the target site and stored in the model information database, out of a plurality of second cohorts on the basis of the acquired first data distribution, the second cohort being associated with a candidate site of another medical facility;

updating the first model on the basis of at least part of a second data set that is the second medical data based on the selected second cohort;

calculating a similarity between the first data distribution and each second data distribution for the second data set based on each of the plurality of second cohorts by calculating distances between the first data distribution and each second data distribution, each of the first data distribution and the second data distribution being a distribution in which factors of medical data are represented as a histogram;

selecting the second cohort of the second data distribution having the highest similarity from the plurality of second cohorts;

determining whether or not the second data set based on the selected second cohort has a data volume required for updating the first model; and updating the first model on the basis of the second data set based on the selected second cohort when determining that the second data set based on the selected second cohort has the data volume required for updating the first model.

11. A non-transitory computer-readable storage medium storing a program causing a computer to perform:

acquiring a first data distribution for a first data set that is first medical data, out of data sets based on a first cohort associated with a target site of a medical facility;

selecting a second cohort that is used to update a first model that is used in the target site and stored in a model information database, out of a plurality of second cohorts on the basis of the acquired first data distribution, the second cohort being associated with a candidate site of an other medical facility;

updating the first model on the basis of at least part of a second data set that is second medical data based on the selected second cohort;

calculating a similarity between the first data distribution and each second data distribution for the second data set based on each of the plurality of second cohorts by calculating distances between the first data distribution and each second data distribution, each of the first data distribution and the second data distribution being a distribution in which factors of medical data are represented as a histogram;

selecting the second cohort of the second data distribution having the highest similarity from the plurality of second cohorts;

determining whether or not the second data set based on the selected second cohort has a data volume required for updating the first model; and updating the first model on the basis of the second data set based on the selected second cohort when determining that the second data set based on the selected second cohort has the data volume required for updating the first model.

* * * * *